United States Patent [19]
Kitagawa et al.

[11] Patent Number: 5,143,950
[45] Date of Patent: Sep. 1, 1992

[54] POWER COATING OF EPOXY RESIN MIXTURE AND POLYVINYL BUTYRAL OR FORMAL RESIN

[75] Inventors: Katugi Kitagawa, Saitama; Akira Shinozuka, Chiba, both of Japan

[73] Assignee: Somar Corporation, Tokyo, Japan

[21] Appl. No.: 600,288

[22] Filed: Oct. 18, 1990

Related U.S. Application Data

[63] Continuation of Ser. No. 229,412, Aug. 8, 1988, abandoned.

[30] Foreign Application Priority Data

Feb. 7, 1987 [JP] Japan ............................ 62-26771

[51] Int. Cl.$^5$ .......................... C08K 3/26; C08K 3/36; C08K 3/22; C08K 3/40
[52] U.S. Cl. .................... 523/429; 523/428; 523/434; 525/485; 525/486; 525/488; 525/524; 525/58
[58] Field of Search ............... 525/524, 481, 485, 486, 525/488; 523/428, 429, 434

[56] References Cited

U.S. PATENT DOCUMENTS

| | | | |
|---|---|---|---|
| 2,915,490 | 12/1959 | Hopper et al. | 525/524 |
| 3,058,951 | 10/1962 | Flowers et al. | 525/57 |
| 3,571,491 | 3/1971 | Markowski | 525/524 |
| 3,842,035 | 10/1974 | Klaren | 525/524 |
| 3,896,082 | 7/1975 | Rensman et al. | 523/400 |
| 3,947,384 | 3/1976 | Schülde et al. | 525/423 |
| 4,009,223 | 2/1977 | Noonan | 525/524 |
| 4,060,655 | 11/1977 | Johannes et al. | 523/400 |
| 4,122,060 | 10/1978 | Yallourakis | 525/523 |
| 4,355,058 | 10/1982 | Gras et al. | 525/528 |
| 4,440,914 | 3/1984 | Helfand et al. | 525/482 |
| 4,499,246 | 2/1985 | Tesson et al. | 525/507 |
| 4,614,674 | 9/1986 | Lauterbach | 523/455 |
| 4,734,468 | 3/1988 | Marx | 523/400 |
| 5,049,596 | 9/1991 | Fujimoto et al. | 525/481 |

Primary Examiner—Robert E. Sellers
Attorney, Agent, or Firm—Sughrue, Mion, Zinn, Macpeak & Seas

[57] ABSTRACT

An epoxy resin powder coating composition comprises 100 parts by weight of bisphenol A mixed epoxy resin having number average molecular weight from 1,700 to 4,500 comprising a bisphenol A epoxy resin (A) having a number average molecular weight from 2,500 to 8,000 and a bisphenol A epoxy resin (B) having a number average molecular weight from 300 to 1,000 (C) a novolak epoxy resin 5 to 20 parts by weight of polyvinyl butyral resin or polyviny formal resin, a hardener, and a filler.

13 Claims, No Drawings

POWER COATING OF EPOXY RESIN MIXTURE AND POLYVINYL BUTYRAL OR FORMAL RESIN

This is a continuation of application Ser. No. 07/229,412 filed Aug. 8, 1988, now abandoned.

FIELD OF THE INVENTION

The present invention relates to an epoxy resin powder coating composition suitably used for insulation of slots of the motor rotors, etc.

BACKGROUND OF THE INVENTION

Epoxy resin powder coating compositions are widely used for the insulation of electric and electronic equipments and parts. An example is in Japanese Patent Application (OPI) No. 161423/85 (the term "OPI" as used herein refers to a published unexamined Japanese patent application) which discloses a blend of an epoxy resin, a novolak type phenol resin, a butyral resin, and an inorganic filler. Another example is in Japanese Patent Application (OPI) No. 89271/86 which discloses a blend of an epoxy resin, an acid anhydride base hardener, triphenylphosphine, and an inorganic filler. Those powder coating compositions are effective to form insulating coating on smooth surfaces, however, they are not yet satisfactory as insulating powder coating compositions for slots having edges such as in motor rotors and stators of electric and electronic equipment and parts. That is, a temperature of 180° C. or higher is adopted to rapidly harden the epoxy resin to form insulating films on slots having edges, however, the aforesaid conventional epoxy resins under such a temperature condition fail to form films with sufficient thickness on the edge parts and also such physical properties as thermal resistance, adhesibility, and impact strength, are far from sufficient. In addition, surface smoothness is not attained.

SUMMARY OF THE INVENTION

The present invention aims to provide an epoxy resin powder coating composition which has overcome the aforesaid problems encountered with conventional epoxy resins. That is, the present invention provides an epoxy resin powder coating composition which comprises as an essential ingredient 100 parts by weight of bisphenol A type mixed epoxy resin having a number average molecular weight from 1,700 to 4,500 comprising a bisphenol A type epoxy resin (A) having a number average molecular weight from 2,500 to 8,000 and a bisphenol A type epoxy resin (B) having a number average molecular weight from 300 to 1,000, 5 to 20 parts by weight of polyvinyl butyral resin or polyvinyl formal resin, a hardener, and a filler.

DETAILED DESCRIPTION OF THE INVENTION

The epoxy resin used in the present invention is based on bisphenol A type epoxy resin as an essential ingredient. A bisphenol A type epoxy resin having a number average molecular weight from 2,500 to 8,000 is mixed with a bisphenol A type epoxy resin having a number average molecular weight from 300 to 1,000, to give a mixture having a number average molecular weight from 1,700 to 4,500, preferably from 2,200 to 4,000, and more preferably from 2,300 to 3,000. When the number average molecular weight is less than 1,700, the edge coverage decreases, and when it exceeds 4,500, it is not appropriate since adhesibility or surface smoothness is damaged and it is apt to form pinholes.

The bisphenol A type epoxy resin (A) having a number average molecular weight from 2,500 to 8,000, to be suitably used in the present invention shows a melting point from 120° to 160°°C., preferably from 130° to 150° C., and the number average molecular weight is preferably from 2,700 to 6,500. The other bisphenol A type epoxy resin (B) having a number average molecular weight from 300 to 1,000 shows a melting point of 75° C. or lower, preferably showing a liquid phase at room temperature, and the number average molecular weight is preferably from 300 to 500. A mixture of (A) and (B) is used for the present invention, and a bisphenol A type epoxy resin with a number average molecular weight exceeding 1,000 and less than 2,500 may be added in a small amount so far as the average molecular weight of the resulting mixture is in the range from 1,700 to 4,500. Further, small amount of epoxy resin of a different type may be added. As an example of an epoxy resin other than the bisphenol A type, desirable are polyfunctional epoxy resins having three or more epoxy groups in the molecule. Such epoxy resins include, for example, novolak type epoxy resin (e.g., o-cresol novolak type, phenol novolak type, etc.), triglycidyl ether type resin (e.g., epoxy compounds of cyanuric acid or triphenylpropane), tetraglycidyl ether type resin (e.g., epoxy compounds of bisresorcinol F or tetraoxytetraphenylethane, etc.). The amount of the polyfunctional epoxy resin to be used is from 5 to 40% by weight, preferably from 5 to 35% by weight, and more preferably from 10 to 30% by weight of the total amount of the mixed epoxy resin. Other types of epoxy resins may be used in the present invention so far as the epoxy resin other than bisphenol A type should not be incorporated in more than 40% by weight of the total amount of the mixed epoxy resin.

Polyvinyl butyral resin and/or polyvinyl formal resin is/are added in the present powder coating composition. The polyvinyl butyral resin to be used in the present invention preferably has a butyralization (the molar number of the butyral group to the total molar number of acetyl group, hydroxyl group, and butyral group being 100) of 70 or higher, and a viscosity (the viscosity at 20° C. of a 1:1 mixture of ethanol and toluene containing 10% of the resin) of from 50 to 200 cps. The polyvinyl formal resin preferably has a formalization (the mol number of the formal group to the total number of acetyl group, hydroxyl group, and formal group being 100) of 68 or higher, and a viscosity (the viscosity at 30° C. of a furfural solvent containing 10% of the resin) of from 50 to 500 cps. The content is from 5 to 20 parts, preferably from 6 to 15 parts by weight, to 100 parts by weight of the mixed epoxy resin. The edge coverage and adhesibility decrease when the content is less than 5 parts by weight, whereas the thermal resistance is decreased when the content exceeds 20 parts by weight. The blend in this content range provides a powder coating composition having a coating property especially improved in edge coverage, even when coated at high temperature.

The hardener to be blended with the powder coating composition of the present invention include those conventionally used, such as aromatic amines, acid anhydrides, guanidines (e.g., dicyandiamide, etc.), and imidazoles. To achieve better effects of the present invention, two or more hardeners having a different hardening speed are appropriately blended to give a mixture of hardeners with controlled hardening speed. Too high a hardening speed results in a hardener which gives a dull coating with poor adhesibility, and too low a hardening speed deteriorates edge coverage. The addition of the hardener differs according to the type. For example, an imidazole base hardener is added from 0.1 to 5 parts, preferably from 0.2 to 4 parts, by weight per 100 parts by weight of the mixed epoxy resin.

When a mixture of two or more hardeners having a different hardening speed is employed, combinations of an imidazole base high hardener with an imidazole base low hardener chosen from below are favorable.

HIGH HARDENER

Imidazole compounds expressed with the general formula (I):

$$R^1-N\underset{R^2}{\underbrace{\hspace{2em}}}N \quad (I)$$

wherein $R^1$ represents a hydrogen atom or an alkyl group substituted with an aryl group (e.g., 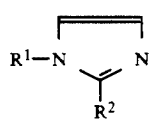), and
$R^2$ represents a substituted or unsubstituted alkyl group (e.g., $CH_3$, $C_2H_5$, $CH(CH_3)_2$, $C_{11}H_{23}$, $C_{17}H_{35}$) or an aryl group (e.g., phenyl, tolyl, xylyl). Preferably, the alkyl group has 1 to 20 carbon atoms and the aryl group has 6 to 20 carbon atoms.

LOW HARDENER

Imidazole compounds expressed with the general formula (I) shown above, wherein $R^1$ represents an alkyl group substituted with a cyano group (e.g., $CH_2CH_2CN$ or

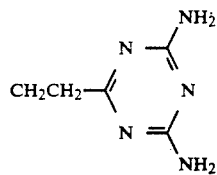

and $R^2$ represents a substituted or unsubstituted alkyl group (e.g., $CH_3$, $C_2H_5$, $CH(CH_3)_2$, $C_{11}H_{23}$, $C_{17}H_{35}$) or an aryl group (e.g., phenyl, tolyl, xylyl). Preferably, the alkyl group has 1 to 20 carbon atoms and the aryl group has 6 to 20 carbon atoms.

In the case of using a combination of imidazole base hardeners, preferably 0.05 to 0.7 parts by weight of a high hardener is used with 0.5 to 3 parts by weight of a low hardener per 100 parts by weight of the mixed epoxy resin.

Inorganic fillers to be suitably blended with the composition of the present invention include silica, calcium carbonate, alumina, clay, mica, talc, and powdered glass fibers. The amount to be blended is from 10 to 80%, preferably from 20 to 50%, by weight of the total amount of powder coating composition.

Conventionally used auxiliary components, such as acrylic acid ester oligomers as the leveling agent, pigments, and a variety of hardening promoters may be appropriately blended to the powder coating composition of the present invention.

Generally used methods are applied to blend the ingredients comprising the epoxy resin composition of the present invention. For example, the ingredients are dry-mixed with a mixer or a like, melt-mixed using a kneader or the like, or solidified by cooling after being melt-mixed using an extruder or the like and ground to fine particles.

The present invention is hereinafter described in greater detail with reference to examples, which are not to be construed as limiting the scope thereof. Unless otherwise indicated, all parts, percents and ratios are by weight.

EXAMPLE 1

105 parts of an epoxy resin (the bisphenol A type epoxy resin having a number average molecular weight of 2,400) comprising 70 parts of Epikote 1007 (a bisphenol A type epoxy resin from Yuka Shell Epoxy Co., Ltd. having a number average molecular weight of 2,900), 15 parts of Epikote XY-310 (from Yuka Shell Epoxy Co., Ltd. containing 95% of Epikote 828, a bisphenol A type epoxy resin having a number average molecular weight of 380), and 20 parts of EOCN 104 (an o-cresol novolak type epoxy resin from Nippon Kayaku Co., Ltd. having a softening point of 95° C.) was mixed with 60 parts of calcium carbonate, 0.5 parts of acrylic acid ester oligomers, 1.5 parts of 2,4-diamino-6-[2'-methylimidazolyl(1)]ethyl-s-triazine, 0.2 parts of 2-methylimidazole, and 2.0 parts of chromium oxide. An epoxy resin powder coating composition was obtained by a common method from the above mixture and polyvinyl butyral resin (abbreviated as PVB hereinafter; S-Lec BMS, from Sekisui Chemicals Co., Ltd.) or polyvinyl formal resin (abbreviated as PVF hereinafter; Denka #20, from Denki Kagaku Co., Ltd.) at the mixing ratio shown in Table 1. A slot of a motor rotor was coated with the above resin by flow immersion at the temperature range from 180° C. to 260° C., and the properties were measured as follows to obtain the results given in Table 1.

(1) Edge Coverage

A half inch square bar was coated with the powder coating composition for about 0.3 mm thick and subjected to ASTM D 296F standardized measurements.

(2) Thermal Resistance

A half inch square bar was coated with the powder coating composition to obtain a film having a thickness of about 0.3 mm. A bare copper wire was hung to the bar, to which a 500 g load was applied. A buzzeror lamp-operating circuit was constructed by applying a voltage of 100 V between the sample and the bare copper wire. The sample was heated at 3° C./min in the furnace, and the temperature was measured at which the lamp or the buzzer was on.

(3) Adhesibility

Two degreased test pieces (soft steel plates of 100 mm×20 mm×3 mm) were heated to about 200° C., and the powder coating composition was adhered, molten on the upper surface (20 mm wide and about 15 mm long) of the tip of the either test piece, and applied to the tip (20 mm wide and 10 mm long) of the other test piece under a load of 1 kg at 200° C. for 10 minutes to harden by heating. Then, the test pieces were left at room temperature, and the tensile strength at which the joint broke was measured. Those having larger strength are evaluated to excel in coating adhesibility.

(4) Impact Strength

Preparation of the Coated Test Piece:

A soft steel plate of 60×60 mm and 3.2 mm thick was coated with the powder coating composition and thermoset to obtain a film of about 0.3 mm in thickness.

Measurement:

A Du Pont type impact tester was employed. A semispherical striker of 1 kg. in weight having a head with a curvature radius of ¼ inch was dropped onto the above coated sample placed on the table having a semispherical hole with a curvature radius of about ¼ inch to concavely deform the plate, and the dropping distance necessary to break and peel off the coating was measured. Those samples having a length of 30 cm or longer were evaluated as having a fair impact strength.

(5) Specular gloss

The 60-degree specular gloss was measured according to the JIS Z-8741 standardized method. The same test piece used for measuring the impact strength was employed.

TABLE 1

| | Test No. | | | | | | | |
|---|---|---|---|---|---|---|---|---|
| | 1 | 2 | 3 | 4 | 5 | 6 | 7 | 8* |
| PVB (parts by weight) | 3.0 | 5.5 | 8.0 | 10 | 15 | — | — | — |
| PVF (parts by weight) | — | — | — | — | — | 5.0 | 8.0 | — |
| Edge coverage (%) | 45 | 55 | 58 | 60 | 63 | 53 | 55 | 24 |
| Thermal resistance (°C.) | 320 | 320 | 300 | 295 | 270 | 310 | 320 | 270 |
| Adhesibility (kg/cm$^2$) | 320 | 345 | 355 | 380 | 385 | 360 | 375 | 295 |
| Impact strength (cm) | 25 | 40 | 40 | 45 | 50 | 35 | 35 | 15 |
| Specular gloss (%) | 85 | 85 | 83 | 80 | 76 | 85 | 85 | 87 |

*A comparative example

EXAMPLE 2

A powder coating composition having the same composition as that of No. 3 in Example 1 except for Epikote 1007 which was substituted by bisphenol A type epoxy resins in the same amount with different molecular weight as shown in Table 2, was prepared and subjected to property measurements. The results are shown in Table 2, related to the average molecular weight of the bisphenol A type epoxy resin.

The epoxy resin marked with A to E are as follows.

A: A 40:30 mixture by weight of Epikote 1001 (number average molecular weight of 900) and Epikote 1007 (average molecular weight of 2,900).

B: A 45:25 mixture by weight of Epikote 1004 (number average molecular weight of 1,600) and Epikote 1007 (number average molecular weight of 2,900).

C: A 20:50 mixture by weight of Epikote 1007 (number average molecular weight of 2,900) and Epikote 1009 (number average molecular weight of 3,800).

D: A 5:65 mixture by weight of Epikote 1009 (number average molecular weight of 3,800) and Epikote 1010 (number average molecular weight of 5,400).

E: A bisphenol A type epoxy resin synthesized by a conventional method (average molecular weight of 6,000).

The average molecular weight shown in Table 2 indicates that of the bisphenol A type mixed epoxy resin included in the coating composition.

TABLE 2

| | 10* | 11 | 12 | 13 | 14* |
|---|---|---|---|---|---|
| Epoxy resin | A | B | C | D | E |
| Average molecular weight | 1,500 | 1,800 | 3,000 | 4,500 | 5,000 |
| Edge coverage (%) | 13 | 55 | 65 | 75 | 88 |
| Thermal resistance (°C.) | 330 | 300 | 290 | 295 | 300 |
| Adhesibility (kg/cm$^2$) | 350 | 355 | 360 | 340 | 320 |
| Impact strength (cm) | 35 | 40 | 40 | 40 | 45 |
| Specular gloss (%) | 85 | 83 | 80 | 75 | 73 |

*A comparative example

COMPARATIVE EXAMPLE

A powder coating composition having the same composition as that of No. 3 in Example 1 except for Epikote 1007 being substituted by EOCN 104 in the same amount (an o-cresol novolak type epoxy resin with softening point of 95° C., from Nippon Kayaku Co., Ltd.) was prepared and edge coverage and the other properties were measured on a sample coated with a the coating composition. The results are given in Table 3.

TABLE 3

| Edge coverage | 55% |
|---|---|
| Thermal resistance | 370° C. |
| Impact strength | 20 cm |
| Adhesibility | 220 kg/cm$^2$ |
| Specular gloss | 85% |

As shown in Table 3, the coating composition based on a novolak type epoxy resin is inferior to the coating composition of the present invention in impact strength and adhesibility.

While the invention has been described in detail and with reference to specific embodiments thereof, it will be apparent to one skilled in the art that various changes and modifications can be made therein without departing from the spirit and scope thereof.

What is claimed is:

1. An epoxy resin powder coating composition which comprises 100 parts by weight of bisphenol A mixed epoxy resin having a number average molecular weight from 2,200 to 4,000 and comprising (A) a first bisphenol A epoxy resin having a number average molecular weight from 2,700 to 6,500, (B) second bisphenol A epoxy resin having a number average molecular weight from 300 to 500, (C) a novolak epoxy resin, 6 to 15 parts by weight of polyvinyl butyral resin or polyvinyl formal resin, a hardener, and a filler, wherein the content of said novolak epoxy resin is from 10 to 30% by weight of said mixed epoxy resin.

2. An epoxy resin powder coating composition as claimed in claim 1, wherein said mixed epoxy resin has a number average molecular weight from 2,300 to 3,000.

3. An epoxy resin powder coating composition as claimed in claim 1, wherein said first bisphenol A epoxy resin (A) has a melting point from 120° to 160° C.

4. An epoxy resin powder coating composition as claimed in claim 1, wherein said second bisphenol A epoxy resin (B) has a melting point of 75° C. or lower.

5. An epoxy resin powder coating composition as claimed in claim 1, wherein said polyvinyl butyral resin has a butyralization of 70 or higher.

6. An epoxy resin powder coating composition as claimed in claim 1, wherein said polyvinyl butyral resin has a viscosity at 20° C. of from 50 to 200 cps.

7. An epoxy resin powder coating composition as claimed in claim 1, wherein said polyvinyl formal resin has a formalization of 68 or higher.

8. An epoxy resin powder coating composition as claimed in claim 1, wherein said hardener is selected from the group consisting of ana romatic amine, an acid anhydride, a guanidine, and an imidazole.

9. An epoxy resin powder coating composition as claimed in claim 1, wherein said hardener is a mixture of an imidazole base high hardener and an imidazole base low hardener.

10. An epoxy resin powder coating composition as claimed in claim 9, wherein said imidazole base high hardener is represented by formula (I):

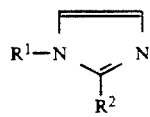

wherein $R^1$ represents a hydrogen atom or an alkyl group substituted with an aryl group, and $R^2$ represents an alkyl group or an aryl group.

11. An epoxy resin powder coating composition as claimed in claim 1, wherein said imidazole base low hardener is represented by formula (I):

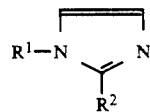

wherein $R^1$ represents an alkyl group substituted with a cyano group and $R^2$ represents an alkyl group or an aryl group.

12. An epoxy resin powder coating composition as claimed in claim 1, wherein said filler is selected from the group consisting of silica, calcium carbonate, alumina, clay, mica, talk, and a powdered glass fiber.

13. An epoxy resin powder coating composition as claimed in claim 1, wherein said novolak epoxy resin (C) is an o-cresol novolak epoxy resin.

* * * * *